United States Patent [19]

Sakurai

[11] Patent Number: 5,105,286

[45] Date of Patent: Apr. 14, 1992

[54] IMAGE READING APPARATUS

[76] Inventor: Tetsuo Sakurai, No. 5-4-19, Ohnodai, Sagamihara-Shi, Kanagawa-Ken, Japan

[21] Appl. No.: 491,588

[22] Filed: Mar. 12, 1990

[30] Foreign Application Priority Data

Mar. 14, 1989 [JP] Japan .................................. 1-59675

[51] Int. Cl.$^5$ .............................................. H04N 1/38
[52] U.S. Cl. .................................... 358/464; 358/483; 358/461
[58] Field of Search ............... 358/461, 463, 482, 483, 358/475; 250/578

[56] References Cited

U.S. PATENT DOCUMENTS

| | | | |
|---|---|---|---|
| 4,001,500 | 1/1977 | Lavery et al. | 358/465 |
| 4,539,600 | 9/1985 | Takahashi et al. | 358/464 |
| 4,578,715 | 3/1986 | Yamaguchi | 358/456 |
| 4,641,357 | 2/1987 | Satoh | 358/483 |
| 4,835,618 | 5/1989 | Shimizy | 358/401 |
| 4,868,685 | 9/1989 | Ueno | 358/471 |
| 4,974,098 | 11/1990 | Miyakawa et al. | 358/464 |

FOREIGN PATENT DOCUMENTS

| | | |
|---|---|---|
| 58-34676 | 3/1983 | Japan . |
| 59-205871 | 11/1984 | Japan . |
| 62-58778 | 3/1987 | Japan . |
| 62-154972 | 7/1987 | Japan . |

Primary Examiner—Edward L. Coles, Sr.

[57] ABSTRACT

An image reading apparatus includes a plural number of line image sensors disposed on a read line, a background detection circuit for detecting a background level of an original document on the basis of an image signal from a sample portion of a reference line image sensor as a line image sensor facing the original document. The sample portion is predetermined as a portion facing the original document. The apparatus also includes a conversion circuit for converting image signals output from the line image sensors, into image data expressed as a relative level when the background level detected by the background detection circuit is used as a white reference level.

11 Claims, 11 Drawing Sheets

FIG. IA PRIOR ART
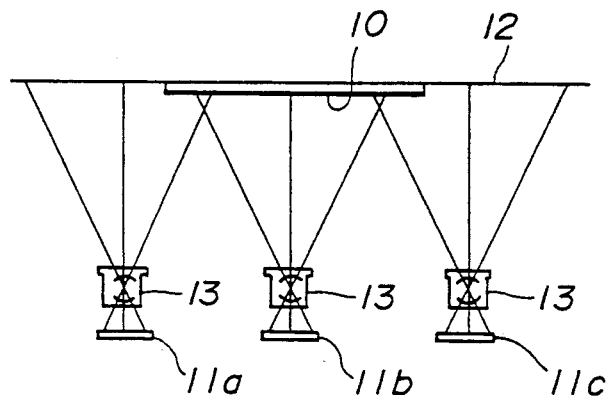
FIG. IB PRIOR ART
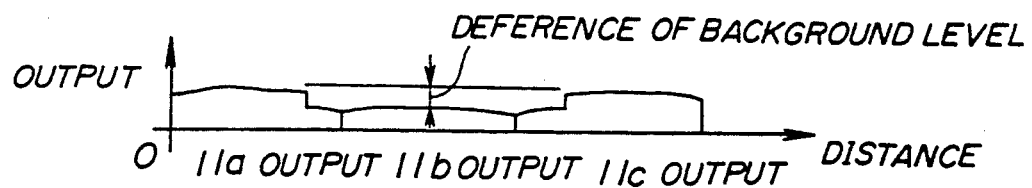

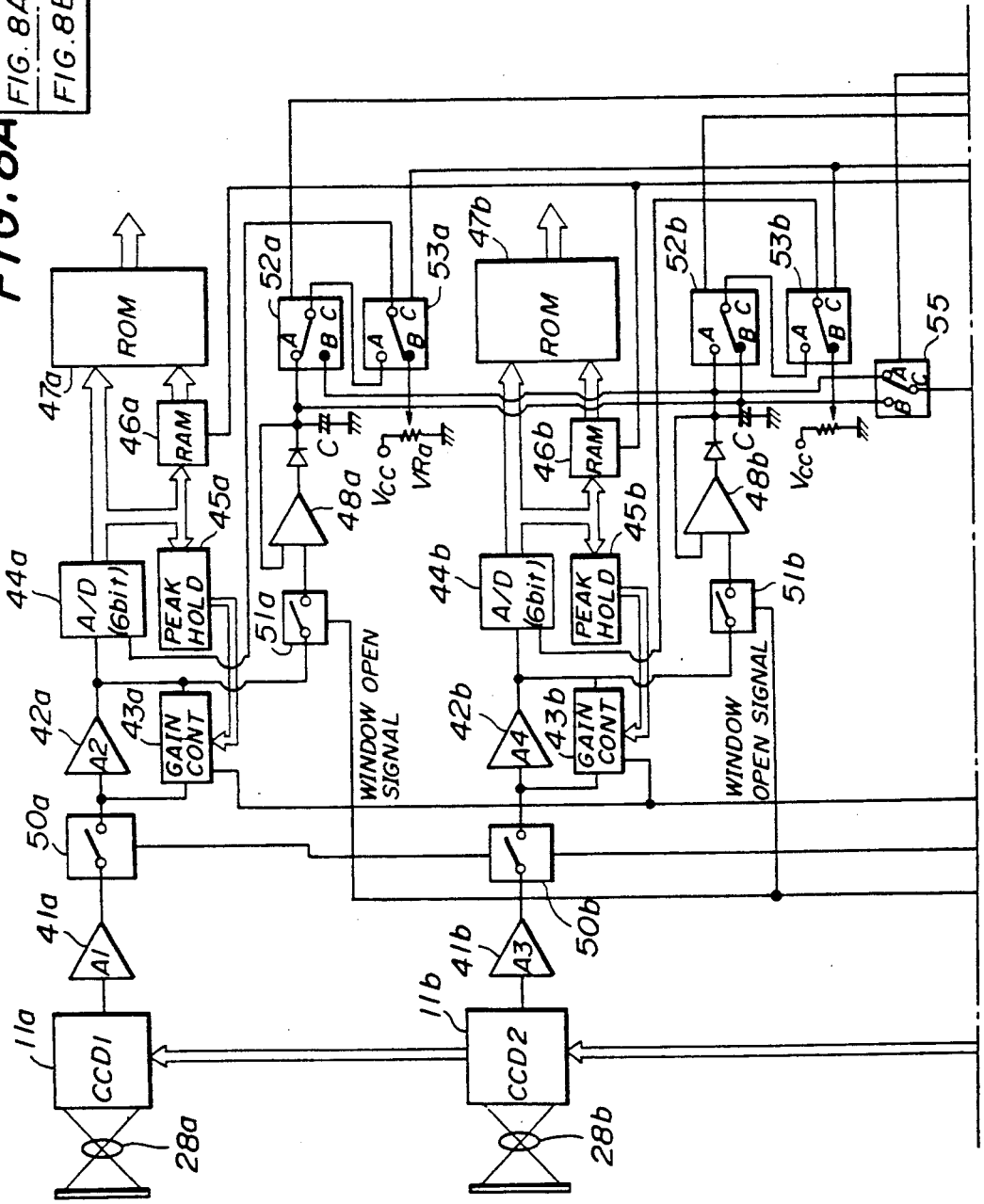

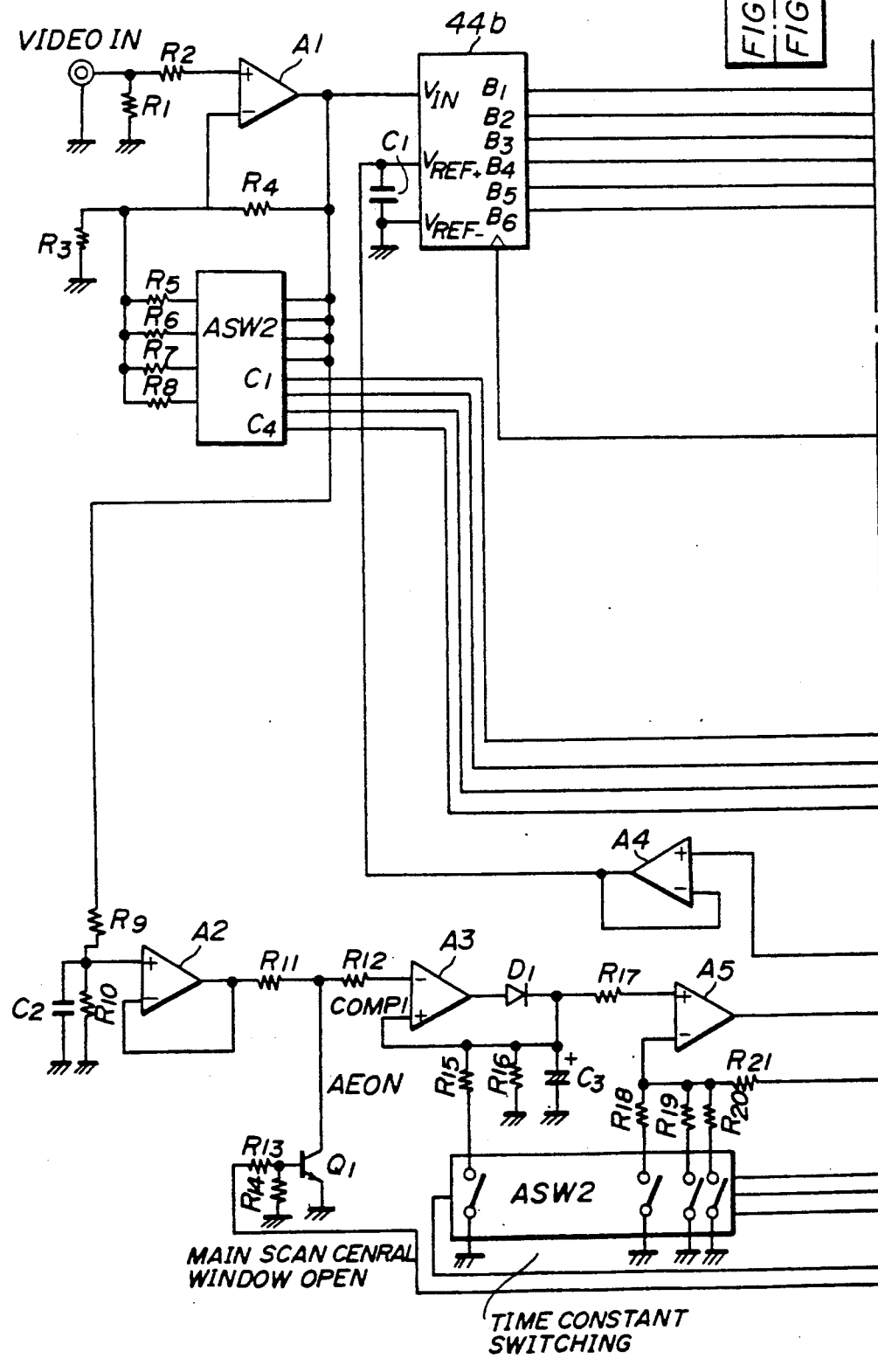

IMAGE READING APPARATUS

BACKGROUND OF THE INVENTION

The present invention relates to an image reading apparatus of the digital processing type and that can be generally applied to photocopiers and facsimile machines and the like, and more particularly relates to an image read apparatus provided with a function for maintaining the background tone of an image read by a plural number of line image sensors, as a white level.

Image reading apparatus that reads an image on one line using a plural number of image sensors have been proposed The configuration of a scanning system of a conventional image read apparatus of this type is indicated in FIG. 1(A), when seen from the direction of the sub scan.

Three CCD image sensors 11a, 11b and 11c are disposed at the lower portion of an original document 10. To the rear of the original 10 is disposed a document holder plate 12 to block out external light. A document holder surface of the document holder plate 12 is a color (such as white, yellow or the like) that generally has a high reflectivity so that is not read as an image. Light from a light source (not indicated in the figure) is reflected from the original document 10 and the document holder plate 12, and this reflected light from the original document 10 and the document holder plate 12 is irradiated via the lens system 13 to each of the CCD image sensors 11a, 11b and 11c. The output image signals from these three CCD image sensors 11a, 11b and 11c are serially synthesized to obtain the image signal for a one line.

In this type of image read apparatus, in order to always have the background portion of the original document reproduced as white, there is provided a function (called an AE function) to always maintain the background tone level of the image read by the image sensor, as a white level. This is to say that when the image sensor scans the original document, the peak level (a whiter level) of the image signal output from the image sensor is always held and the output signal from the image sensor is converted to image data (black and white data or tone data) using this held peak level as the white reference.

The output signal from the image sensor is for example, converted into image data in the following manner.

The whiter level signal that is held as the peak is input to the conversion reference input terminal ($V_{REF}$) of an analog-to-digital converter (hereinafter termed an A/D converter) and the image signal from the image sensor is input to the analog input terminal of this A/D converter. The A/D converter converts the image signal between the black level ($0v$) and the white level (Reference input) into for example 6-bit (64 gradation) or 8-bit (256-gradation) digital image data. The reference input level of the A/D converter is always at the maximum value (3FH in the case of 6-bit) of the conversion data. In addition, even if there is a change in the background level of the original that is read by the image sensor, then the peak hold circuit follows that change. Accordingly, the image background tone level read by the line image sensor is maintained at a constant white level.

The 6-bit or the 8-bit image data converted by the A/D converter has the necessary image processing performed and is output from this image read apparatus.

Image read apparatus used in digital photocopiers are able to have many and varied types of original documents as the object. The size of the original documents that are handled can vary from large to small, as for example, original documents ranging from a maximum size of A0 to a minimum size of B5 can be read. In such a conventional image read apparatus, there is the following problem when small size original documents read.

As indicated in FIG. 1A, when a small-size original document 10 is placed in the center of a scan line, the peak level obtained from a central image sensor 11b differs as indicated in FIG. 1B for example, from the peak level obtained from the image sensors 11a and 11c on either side. Accordingly, the control so that the peak level in all of the image signals obtained from the three CCD image sensors 11a, 11b and 11c becomes the background level, is such that the white level of the document holder plate 12 becomes the background level if the background level of the original document 10 is low (such as in the case of diazocopy, original documents with colored backgrounds, secondary diazo originals and the like). This is to say that the background portion of the original document 10 is reproduced as an image having a constant tone.

In addition, when there is independent control by the AE function for each of the three CCD image sensors 11a, 11b and 11c, then the image signal from the central image sensor 11b is converted into image data the background level of the original document 10 as the reference. However, the image signals from the image sensors 11a and 11c on either side are converted into image data using the white level of the document holder plate 12 as the white level. In this case, the portions on both sides of the original document 10 and that is scanned by the image sensors 11a and 11c is reproduced as an image having a constant tone.

For example, in a image read apparatus that can read sizes up to A0, when an original of A3 size is read, the central image sensor 11b can only read 317.5 mm (including the overlap portion with the left and right image sensors 11a and 11c) of the 420 mm lateral width of the original document (where there is a total of 5000 picture elements and a density of 400 DPI). Accordingly, the 50–55 mm for the portions on either side of the original document 10 which is scanned by the image sensors 11a and 11c is reproduced as an image having a constant tone. In addition, the portion of the borders of the scanning area of the image sensors 11a and 11c with the scanning area of the image sensor 11b is expressed as different image data for the same areas. In this case, a missing of information occurs when such image data is binarized. When the image data appears as mid-tones, the tone of the border portions is different from that of the adjacent portions thereof.

SUMMARY OF THE INVENTION

Accordingly, a general object of the present invention is to provide a novel and useful image reading apparatus in which the disadvantages of the aforementioned prior art are eliminated.

A more specific object of the present invention is to provide an image reading apparatus in which the background level of an original document is controlled definitely to a white level even when a plural number of line sensors are used to scan a small original document.

The above objects of the present invention is achieved by an image reading apparatus comprising a plural number of line image sensors disposed on a read line, images being produced on the basis of image signals output from the line image sensors when the line image sensors scan and original document, background detection means for detecting a background level of the original document on the basis of an image signal from a sample portion of a reference line image sensor predetermined as a line image sensor facing the original document, the sample portion being predetermined as a portion facing the original document, and conversion means for converting image signals output from the line image sensors, into image data expressed as a relative level when the background level detected by said background detection means is used as a white reference level.

Other objects and further features of the present invention will be apparent from the following detailed description when read in conjunction with the accompanying drawings.

BRIEF DESCRIPTION OF THE DRAWINGS

FIGS. 1A and 1B are views indicating the structure of a conventional original document scanning system, and the status of the image signals.

FIG. 4 is a diagram showing how to combine FIGS. 4A and 4B;

FIG. 5 is a diagram showing how to combine FIGS. 5A and 5B;

FIG. 8 is a diagram showing how to combine FIGS. 8A and 8B;

FIG. 9 is a diagram showing how to combine FIGS. 9A and 9B;

FIGS. 8A and 8B and FIGS. 9A and 9B are circuit diagrams indicating a control system of an image read apparatus relating to second embodiment according to the present invention.

DESCRIPTION OF THE PREFERRED EMBODIMENTS

Figure 2:
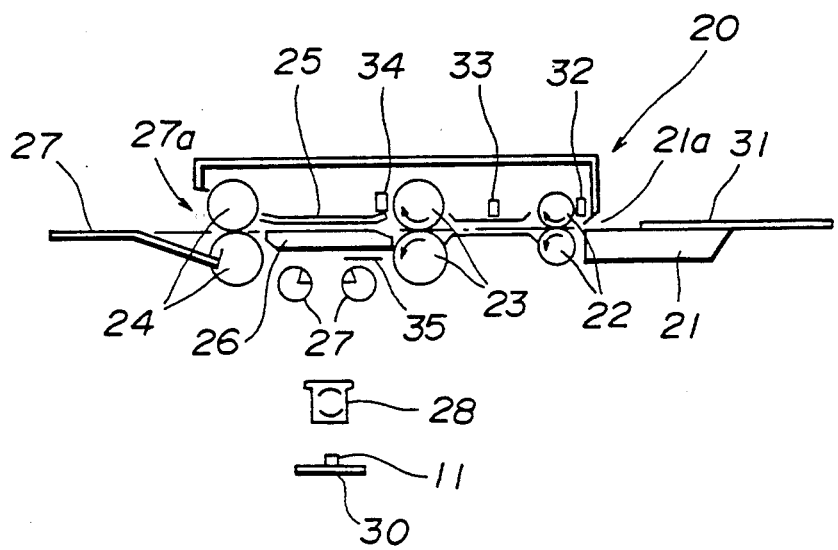
FIG. 2 is a view indicating the structure of an original document conveyance system of an image reading apparatus relating to an embodiment according to the present invention.

The following is a description of an original conveyance mechanism used in an image read apparatus, with reference to FIG. 2.

In an original document conveyance mechanism 20, a conveyance path formed between an inlet opening 21a and an exit opening 27a is provided with rollers 22, 23 and 24 for conveying original documents. At a position adjacent to the roller 22 on the side of the inlet opening 21a is provided a first document sensor 32. At an intermediate position along the conveyance path between the roller 22 and the roller 23 is disposed a second document sensor 33. In the conveyance path between the roller 23 and the roller 24 is provided a contact glass 26 supporting the original document and an document holder plate 25 facing the contact glass 26. At a position immediately after the roller 23 is provided a third document sensor 34. At a lower portion of the contact glass 26 are disposed a fluorescent lamp 27 that irradiates light to an original document which is conveyed, a lens system 28 and a line image sensor 11 (one-dimensional photo-electric conversion element, CCD). The line image sensor 11 is fixed to a printed circuit board 30 which incorporates circuits to drive the line image sensor 11 and the like. In addition, at a lower end of the contact glass 26 is disposed a white-color reference plate 35 used for shading compensation. This white-color reference plate 35 is normally disposed at a position where it does not obstruct the scanning of the original document, and moves to a position indicated in the figure when a data sampling for shading compensation is performed. On the outer side of the inlet opening 21a is provided an document table 21 and on the outer side of the exit opening 27a is provided a discharge tray 27b.

Figure 3:
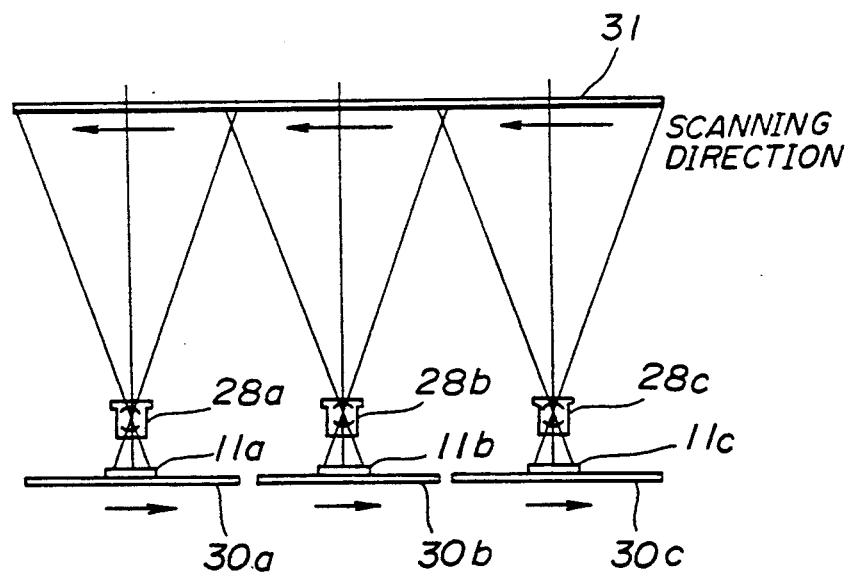
FIG. 3 is a view indicating the structure of an original document scanning system of an image reading apparatus relating to an embodiment according to the present invention.

FIG. 3 indicates the status of the disposition of the image sensor, when seen from a direction perpendicular to the direction of conveyance of the original document 31. In FIG. 3, three line image sensors 11a, 11b and 11c are disposed in the direction of scanning. Corresponding to each of these line image sensors 11a, 11b and 11c are disposed lens systems 18a, 18b and 18c for forming an image on the original document 31, upon the light-receiving surfaces of the line image sensors. Each of the line image sensors 11a, 11b and 11c are independently fixed to printed circuit boards 30a, 30b and 30c.

The image data for one scanning line is processed with the center of one line as the center of the original document. Accordingly, the original document 31 is conveyed in the status where a central position of one scanning line is in agreement with the central position across the width of the original document 31 (i.e. with a center reference).

When the original document 31 is inserted into the inlet opening 21a and in alignment with the document table 21, the first document sensor 32 detects the leading edge of the original document 31. The detection signals from this first document sensor 32 are used as the basis for the start of rotation of the conveyance roller 22 and for the fluorescent lamp 27 to light. Then, the original document 31 is conveyed by the conveyance roller 22. When the second document sensor 33 detects the leading edge of the original document 31, the detection signals from the second document sensor 33 are used as the basis for the rotation of the conveyance roller 23. Furthermore, the white-color reference plate 35 is moved to a position where it obstructs the scanning of the original and performs data sampling for shading compensation. In this data sampling, the light from the fluorescent lamp 27 is irradiated to the white-color reference plate 35 and the reflected light is irradiated to each of the image sensors 11a, 11b and 11c via each of the lens systems 18a, 18b and 18c. When this occurs, the image signal (data) output from each of the image sensors 11a, 11b and 11c is sampled. When the third document sensor 34 detects the leading edge of the original document 31, the detection signals from the third document sensor 34 are used as the basis for returning the white-color reference plate 35 to its former position. Then, during the time that the original document 31 is being conveyed at a constant speed across the contact glass 26, the original document 31 is scanned by each of the line image sensors 11a, 11b and 11c. The image signals output from each of the line image sensors 11a, 11b and 11c have shading compensation performed on the basis of the above described sampling data and are converted into image data.

When the original document 31 is scanned, the three line image sensors 11a, 11b and 11c are driven at the same time, on the basis of the same drive clock signals and timing signals. Then, the line image sensors 11a, 11b and 11c perform simultaneous scanning of three areas divided across the direction of the main scan. The image data obtained from this scanning of the original document 31 is stored alternately into two RAMS; one for odd numbered lines and one for even numbered lines. Then, during the time that the image data is being written, image data is successively and alternately read at a frequency of 24 MHz, from the RAM for which write is not being performed. The RAM for odd-numbered lines and the RAM for even-numbered lines comprise a toggle buffer. The image data for one line is output as data of 14,645 pixels (930 mm at a density of 400 DPI) which is the number of pixels in the direction of the main scan (15,000) minus the number of pixels for the boundary portions of each sensor.

Figure 4A:
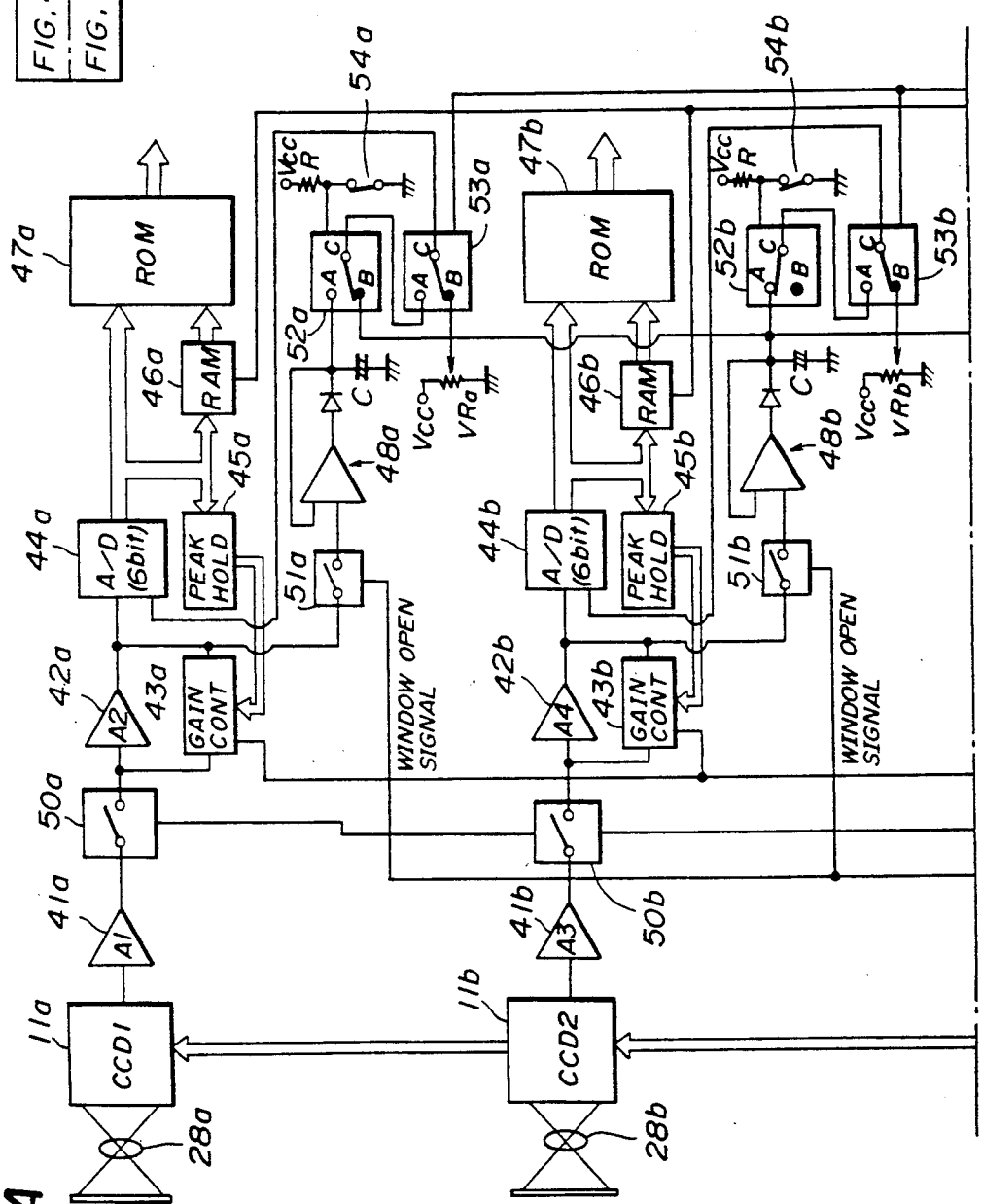
FIGS. 4A and 4B and FIGS. 5A and 5B are circuit diagrams indicating a control system of an image reading apparatus relating to an embodiment according to the present invention.
Figure 4B:
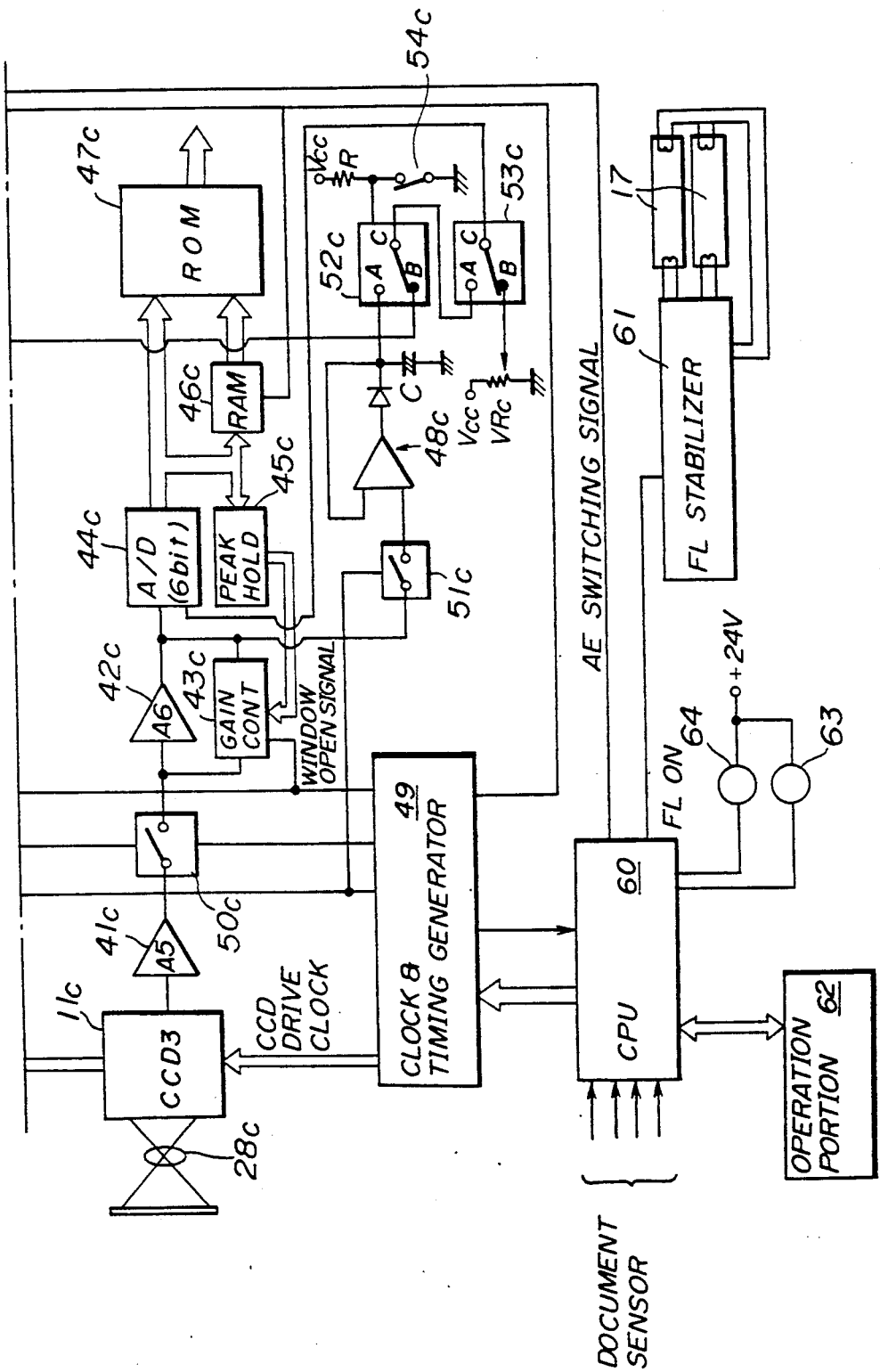

The following is a description of the control system for the image reading apparatus, with reference to FIGS. 4 and 4B.

Operation signals from an operation portion 62 and detection signals from each of the document sensors 32, 33 and 34 indicated in FIG. 2 are input to a central processing unit (CPU) 60. The CPU 60 uses the above described detection signals and operation signals as the basis for controlling each of the motors 43 and each of the solenoids 44 provided in the machine, and the fluorescent lamp stabilizer 61. In addition, the CPU 60 outputs AE conversion signals that change between the mode (the AE mode) where the detected background level is automatically set as the white level, and the mode where the background level that is to be made the white level is set manually. A clock and timing generator 49 generates various timing signals and control signals and the like on the basis of the basic clock from the CPU 60.

The configurations of each of the control circuits with respect to each of the line image sensors 11a, 11b and 11c are the same and so the following description will be given of only the control circuit with respect to the line image sensor 11b positioned in the center of the scan line.

Each of the line image sensors 11a, 11b and 11c use a concentration of 5,000 cells at a 7 μm pitch (such as the Toshiba TC106C, for example). The read density of these line image sensors becomes 400 DPI on the surface of the original document 31. The line image sensor 11b is driven by an 8 MHz clock. This clock and the SYNC signals that express one line and the like ar generated by the clock and timing generator 49. The output signal from the line image sensor 11b is minute signal at approximately 50 mV and so when those output signal (image signals) undergo direct A/D conversion, the error becomes great due to noise and the like. Because of this, the video amplifier 41b amplifies the image signal from the line image sensor 11b by approximately ten times. The drive clock is super posed on the image signal from the line image sensor 11b, as a component of the noise and so at a predetermined timing, an analog switch 50b samples the output signal from the line image sensor 11b via the video amplifier 41b and extracts only the image signal component. A sampling signal with respect to the analog switch 50b is given from the clock and timing generator 49. The image signal extracted by the analog switch 50b is input to the analog input terminal of the analog-to-digital converter 44b via the variable amplifier 42b. White reference signal to be described later, are input to the reference input terminal of this analog-to-digital converter 44b. The analog-to-digital converter 44b outputs the relative level of the image signals with respect to the white reference signal, as the image data. The output of the analog-to-digital converter 44b is for example, 6-bit. In this case, the analog-to-digital converter 44b converts the signal levels between the white reference and black as image data with 64 gradations. The variable amplifier 42b is used to make the white level of the image signal input to the analog-to-digital converter 44b constant. When the (white-colored) document holder plate 25 is scanned prior to the scanning of the original document 31, the peak hold circuit 45a holds the peak data of the image data from the analog-to-digital converter 44b. The image data (white data) held in this peak hold circuit 45a is given to the gain control circuit 43b. The gain control circuit 43b control the gain of the variable amplifier 42b on the basis of the given image data values. The gain of the variable amplifier 42b is controlled within the range of the minimum amplification value 8 and the maximum amplification ratio 40. The gain of the variable amplifier 42b is controlled so that the image signal level obtained when the white-colored document holder plate 25 is scanned, becomes the maximum value (3FH in the case of 6-bit) of the A/D conversion value.

The image data obtained when the white-color reference plate 35 is scanned is stored in the RAM 46b as compensation data. The data that is stored in the RAM 46b is 6-bit data corresponding to pixels 1 through 5,000 of the line image sensor 11b. The ROM 47b has an arithmetic function for shading compensation. When the original document 31 is scanned, compensation arithmetic data corresponding to the compensation data from the RAM 46b (6-bit) and to image data of each pixel is read from the ROM 47b. This is to say that image data for which shading compensation has been performed is output.

The image signal output from the variable amplifier 42b are also input to the peak hold circuit 48b via an analog switch 51b. When the "window open signal" from the clock and timing generator 49 is valid, the analog switch 51b gives the image signal from the variable amplifier 42b to the peak hold circuit 48b. The peak hold circuit 48b holds the peak level (white level) of the image signal. The peak level signal held by the peak hold circuit 48b is given to a terminal (A) of the analog switch 52b. A common terminal (C) of the analog switch 52b is connected to a terminal (A) of the analog switch 53b. The output of a common terminal (C) of the analog switch 53b is input to the reference input terminal of the analog-to-digital converter 44b. A terminal (B) of the analog switch 53b is connected to the reference power source ($V_{CC}$ and a variable resistor $VR_b$). The analog switch 52b is switched between terminal (A) and terminal B by the switch 54b. The analog switch 53b switches between terminal A and terminal B by the AE switching signal from the CPU 60. When the AE switching signal is valid (i.e. the AE mode), the analog switch 53b selects terminal A and when the AE switching signal is not valid (i.e. the manual mode), the analog switch 53b selects terminal B. In the manual mode, the reference voltage from the reference power source is given to the reference input terminal of the analog-to-digital converter 44$b$. This reference voltage is changed according to the rectification of the variable resistor VR$_B$.

The output signal of the peak hold circuit 48$b$ in the control system for the line image sensor 11$b$ are applied to the terminal B of the analog switches 52$a$ and 52$c$ in the control system for the line image sensors 11$a$ and 11$c$. This is to say that in the AE mode, the background level detected by the system of the image sensor 11$b$ is applied to the reference input terminals of the A/D converters 44$a$ and 44$c$ in each of the systems for the line image sensors 11$a$ and 11$c$.

Figure 5A:
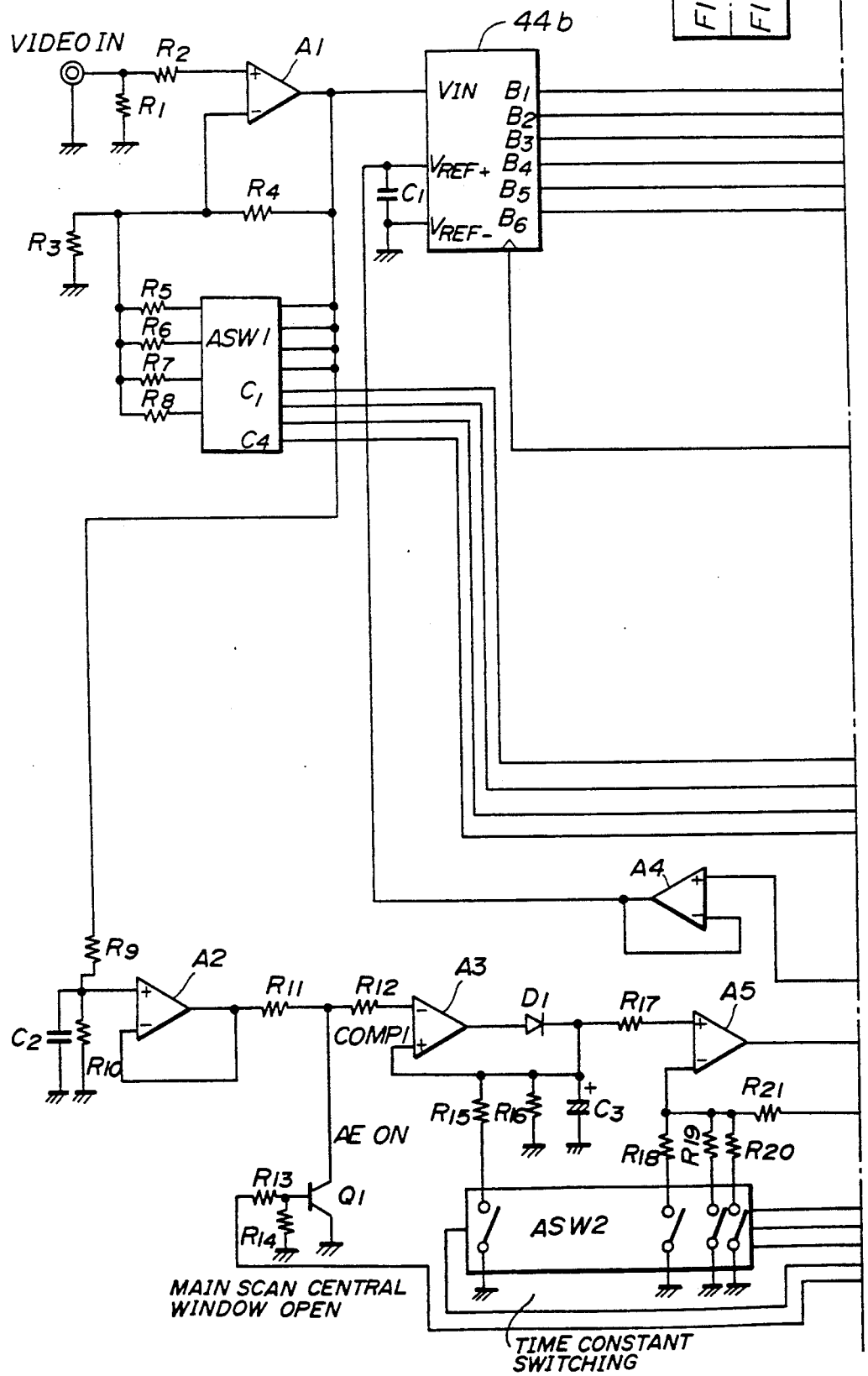
Figure 5B:
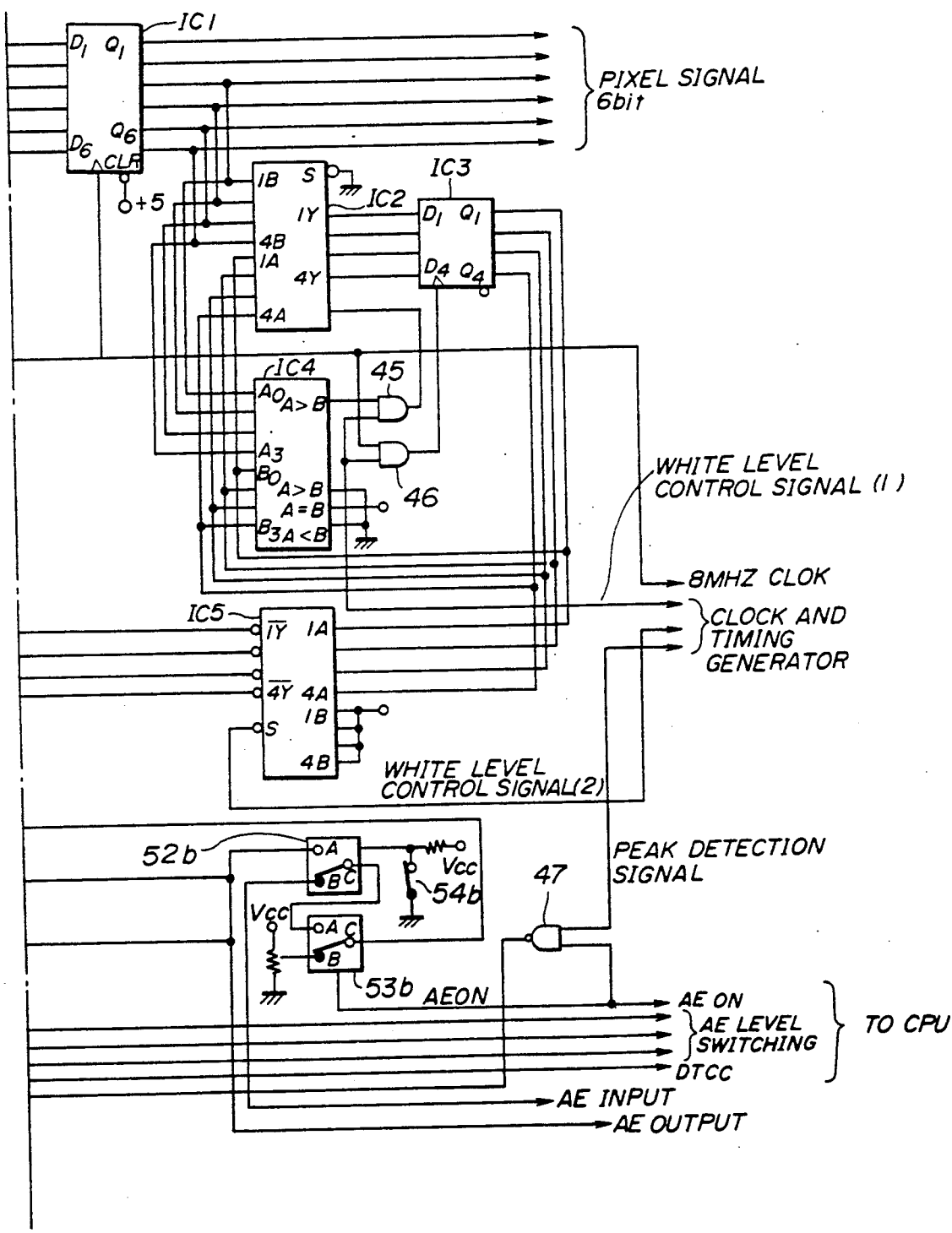

The configuration of the circuit described above and that includes the variable amplifier 42$b$, the gain control circuit 43$b$, the analog-to-digital converter 44$b$, the peak hold circuit 45$b$, the analog switch 51$a$, the peak hold circuit 48$b$, and the analog switches 52$b$ and 53$b$ is indicated in detail in FIG. 5A and 5B.

In FIG. 5A and 5B, the operational amplifier A$_1$, the resistors R$_1$, R$_2$ and the feed-back resistor group R$_3$ through R$_8$ configure the variable amplifier 42$b$ described above. The analog switch ASW$_1$ that switches the status of connection of the feed-back resistors R$_5$ through R$_8$ configures the gain control circuit 43$b$ described above. The (6-bit) output data of the analog-to-digital converter 44$b$ is latched by a latch circuit IC$_1$. The most significant four bits of the image data that is latched by the latch circuit IC$_1$ is input to the input terminals (1B through 4B) of the selection circuit IC$_2$ and the input terminals (A$_0$ through A$_3$) of the comparison circuit IC$_4$. The output data from the selection circuit IC$_2$ is latched by the latch circuit IC$_3$. The image data that is latched by the latch circuit IC$_3$ is input to the input terminals of the selection circuit IC$_2$ (1$_A$ through 4$_A$) and the input terminals (B$_0$ through B$_3$) of the comparison circuit IC$_4$. The comparison circuit IC$_4$ makes the judgment signal valid when the data input to the input terminals (A$_0$ through A$_3$) is greater than the data input to the input terminals (B$_0$ through B$_3$). The judgment signal is input as selection signal to the selection circuit IC$_2$ via an AND gate 45. The selection circuit IC$_2$ outputs the data input to the input terminals (1$_A$ through 4$_B$), from the output terminals (1$_Y$ through 4$_Y$) when the selection signal is valid. The 8 MHz clock the same as the drive clock for each of the image sensors 11$a$, 11$b$ and 11$c$ is input to the latch circuit IC$_1$ and the analog-to-digital converter 44$b$ as a timing signal. In addition, this 8 MHz clock is supplied as a timing signal to the latch circuit IC$_3$ via the AND gate 46. The AND gates 45 and 46 have the white level control signal (1) input to them from the clock and timing generator 49. Accordingly, the selector circuit IC$_2$, the latch circuit IC$_3$ and the comparison circuit IC$_4$ operate validly when the white level control signal 1 is valid. In the circuit that includes the selection circuit IC$_2$, the latch circuit IC$_3$ and the comparison circuit IC$_4$, the image data that is latched to the latch circuit IC$_3$ and the new image data that is output from the analog-to-digital converter 44$b$ are compared and when the value of the new image data is greater (whiter) than the value of the latched data, then this new image data is latched by the latch circuit IC$_3$. When the value of the new image data is equal to or less than the value of the latched data, the latch data is latched once again by the latch circuit IC$_3$. This is to say that the circuit that includes the selection circuit IC$_2$, the latch circuit IC$_3$, the comparison circuit IC$_4$ and the AND gates 45 and 46 configures the peak hold circuit 45$a$ as indicated in FIG. 4A.

The data that is latched to the latch circuit IC$_3$ is input to the input terminal (1A through 4A) of the selection circuit IC$_5$. Predetermined data is always input to the other input terminals (1B through 4B) of this selection circuit IC$_5$. The analog switch ASW1 performs connection switching of the feed-back resistors R$_5$ through R$_8$ in accordance with the inverted output data (1Y through 4Y) from the selection circuit IC$_5$. The white level control signal (2) from the clock and timing generator 49 is input as selection signal to the selection circuit IC$_5$. The selection circuit IC$_5$ outputs the inverted data (1Y through 4Y) for the data that is input to the input terminals (1A through 4A) when the white control signal 2 is valid.

The image signal from the operational amplifier A$_1$ input to a smoothing processing circuit configured from the resistors R$_9$ and R$_{10}$, a capacitor C$_2$ and an operational amplifier A$_2$. This smoothing processing circuit does not have a fast response to changes in the image signal (i.e. changes in the tone). The output signal from the smoothing processing circuit is input to an operational amplifier A$_3$ via resistors R$_{11}$ and R$_{12}$. This operational amplifier A$_3$, a diode D$_1$, resistors R$_{15}$ and R$_{16}$ and a capacitor C$_3$ make up the peak hold circuit 48$b$ indicated in FIG. 4A. In this peak hold circuit, the capacitor C$_3$ always holds the peak level. Then, the circuit is set so that the discharge time constant is large than the charge time constant with respect to the capacitor C$_3$. The output signal from this peak hold circuit is input to an operational amplifier A$_5$ via a resistor R$_{17}$. The operational amplifier A$_5$ and the feed-back resistor group R$_{18}$ through R$_{20}$ make up a variable amplifier. In the status where the analog switches 52$b$ and 53$b$ are selecting the terminal A, the peak level (white level) held by the peak hold circuit (C$_3$) is supplied to the reference input terminal V$_{REF}$+ of the analog-to-digital converter 44$b$ via the variable amplifier, the analog switches 52$b$ and 53$b$, and the buffer A$_4$.

A transistor Q$_1$ is connected to the contact point between the resistor R$_{11}$ and the resistor R$_{12}$. This transistor Q$_1$ and resistors R$_{13}$ and R$_{14}$ connected to the base of transistor Q$_1$ make up the analog switch 51$a$ indicated in FIG. 4A. The AE switching signal from the CPU 60 and a peak detection signal from the clock and timing generator 49 are input to the AND gate 47. The output signal from the AND gate 47 i input as "window open signal" to the transistor Q$_1$ via the resistor R$_{13}$. This is to say that the "window open signal" become valid when in the AE mode and when the peak detection signal are valid. When the "window open signal" become valid, the transistor Q$_1$ becomes OFF, and the image signal from the smoothing processing circuit (A$_2$) is supplied to the peak hold circuits (A$_3$, C$_3$).

An analog switch ASW2 performs the connection or separation of a resistor R$_{15}$ in the peak hold circuit, on the basis of the discharge timing control signal DTCC from the CPU 60. In addition, the analog switch ASW2 switches the connection status of the feed-back resistor group R$_{18}$ to R$_{20}$ of the variable amplifier (A$_5$), on the basis of the AE level switching signal from the CPU 60. Due to changing the gain of the variable amplifier (A$_5$), it is possible to adjust the contrast of the overall image.

Figure 6:
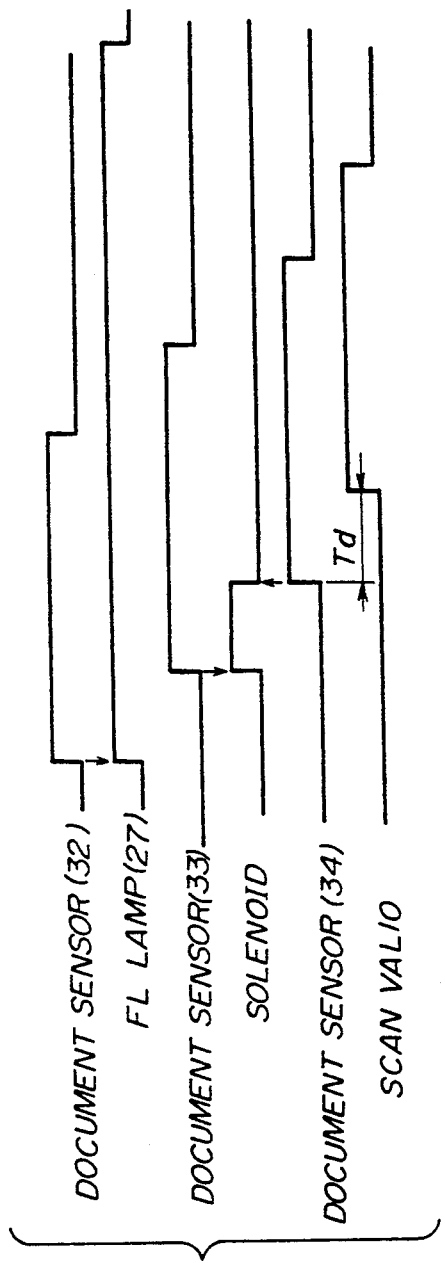
FIG. 6 is a timing chart of signals output when an original document is conveyed.

The following is a description of the processing until the commencement of scanning of the original document 31, with reference to the timing chart shown in FIG. 6.

The original document 31 is conveyed and the fluorescent lamp 27 lights when the first document sensor 32 turns on. The original document 31 is conveyed further and when the second document sensor 33 turns on, the solenoid that moves the white-color reference plate 35 turns on. Then, this status is maintained until the third document sensor 34 turns on. Sampling for shading compensation is performed during the time from when the second document sensor 33 turns on until the time that the third document sensor 34 turns on.

Shading compensation is processing that is performed so that non-uniformity of the sensitivity of each of the cells in the image sensor, non-uniformity of the light of the fluorescent lamp 27 and the lowering of the peripheral light amount (due to the $\cos^4\theta$ rule) for the lens systems 18a through 18c do not give an adverse influence to the read data. The white data that is obtained from scanning the white-color reference plate 35 is the shading compensation data. The white-color reference plate 35 is not in the same plane as the original document 31 and so an imagery surface of the white-color reference plate 35 is not in agreement with the light receiving surface of the line image sensor. However, only white data is obtained and so this presents no problem. During the time that this shading compensation data is being sampled, the data stored in the RAM 46b and the output data from the analog-to-digital converter 44b are compared for the same pixels. Then, when the output data from the analog-to-digital converter 44b is greater (whiter) than the data stored in the RAM 46b, the data in the RAM 46b is replaced. Even if there are changes in the amount of light of the fluorescent lamp 27 when it lights, there is no adverse influence upon the shading compensation data. If the white-color reference plate 35 is driven slowly by a motor or the like and not be a solenoid, then grime and non-uniformity of color of the white-color reference plate 35 will not produce any adverse influence upon this shading compensation data.

When the third document sensor 34 detects the leading edge of the original 31, the CPU 60 counts the line synchronization signals (LSYNC) generated by the clock and timing generator 49. Then, when this count value reaches a value that is equivalent to the delay time $T_d$, the scan valid signal (SCAN VALID) rises. During the time that this scan valid signal is risen, the output image signals from each of the line image memories 11a, 11b and 11c are processed as valid signals.

The timing for the start of the exposure is compensated for on the basis of the magnification (document conveyance speed) in the direction of the sub scan. Because the period of the line synchronization signals (LSYNC) is constant and has no relationship to the document conveyance speed.

During the period from when the above described third document sensor 34 turns on until the scan valid signal (SCAN VALID) rises (i.e. the delay time $T_d$), gain control of the previously described variable amplifiers 42a, 42b and 42c is performed.

Figure 7:
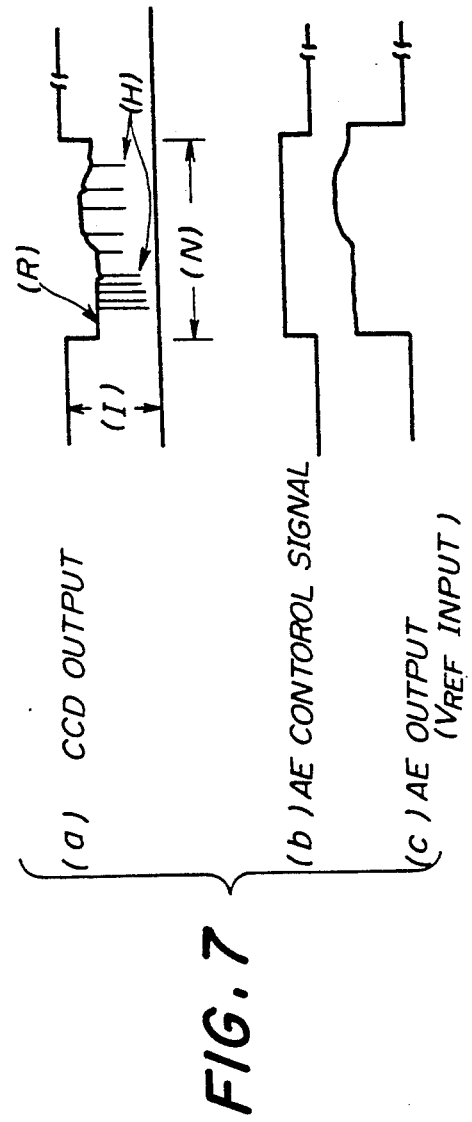
FIG. 7 is a signal waveform diagram indicating the image signals, the AE control signals and the AE output.

The following will be a description of the AE function, with reference to the signal waveform diagram indicating in FIG. 7.

When an original document having a small width (such as 182 mm in the case of B5 size) which is smaller than the maximum read width (such as A0 size) is read by the three line image sensors, the image signal for one line and which are output from the three line image sensors 11a, 11b and 11c have the waveforms as indicating in FIG. 7(a). As has been described, the original document 31 is conveyed so that the center of the original document 31 is in a status whereby it is in agreement with the center of one scan line (i.e. the center reference status) and the image signal for one scan line has a reference white signal portion (I) corresponding to the document holder plate 25 at both ends and an original signal portion (N) corresponding to the original document 31 at the center. Furthermore, the original signal portion (N) has a background signal portion (R) and a black signal portion (H) corresponding to image such as characters and the like. All of these image signals are made the object when peak hold is performed and the reference white signal (I) is made the peak hold irrespective of the background tone of the original document 31. When this held white level undergoes image processing as the background level, the background portion of the original document 31 is processed as an image having a tone greater than white. Accordingly, only the image signal corresponding to the center portion of a scan line has control performed so that it becomes the object of peak hold. A center portion of this scan line is the portion corresponding to the original document 31 that is conveyed in accordance with the center reference. In addition, the center portion of this scan line is determined as the shared portion that is passed by all original documents for which read is allowable (such as from B5 size to A0 size). For example, the center portion of the scan line is determined as 50 mm. This center portion of the scan line is equivalent to the center portion (50 mm) of the central image sensor 11b.

If document scan is performed to until 2 to 3 mm from the leading edge of the original 31, then the AE switching signal from the CPU 60 will become valid (AE mode). When the AE switching signal become valid, then the analog switches 53a, 53b and 53c in the control systems for each of the line image sensors 11a, 11b and 11c select the terminal A, and the output of AE control signal (peak detection signal) indicated in FIG. 7(b) commences from the clock and timing generator 49. In accordance with the center portion (50 mm) of a scan line and as indicated in FIGS. 5A and 5B, these AE control signal (peak detection signal) are supplied as "window open signals (main scan central window open signal)" from the clock and timing generator 49 to the transistor $Q_1$ making up the analog switch 51b inside the control system of the line image sensor 11b. During the time that the "window open signal" are being supplied, the transistor $Q_1$ turns off and the image signal is supplied to the peak hold circuit ($A_3$, $C_3$) via the smoothing processing circuit ($A_2$) in FIG. 5A. When this occurs, as indicated in FIG. 7C, the image signal output from the smoothing processing circuit only include the background signal. Accordingly, the peak hold circuits ($A_3$ and $C_3$) perform successive peak hold of the background level of the original. Then, in the control system of the line image sensor 11b, the original background level held by the peak hold circuits ($A_3$ and $C_3$) is supplied to the reference input terminal ($V_{REF}+$) of the analog-to-digital converter 44b via the analog switches 52b and 53b. In addition, in the control system of the line image sensor 11b, the background level of the original document and that has been peak held as described above, is supplied to the reference input terminal ($V_{REF}+$) of the analog-to-digital converters 44a and 44b via the analog switches 52a and 53a (52c, 53c). Accordingly, the systems of each of the line image sensors 11a, 11b and 11c output the relative level of the image signal as the image data, with the reference being the background level of the original document for which peak hold was performed. This is to say that the background level of the original is output as hexadecimal data 3F (111111=3F for 6-bit data) and the black data is output as the ground level 0H. Then, image signal between the background level and the black level of the original are converted into 6-bit image data.

Even if there are slight fluctuations in the background level of the original document, if the period of the fluctuations are greater than the discharge time constant of the peak hold circuits ($A_3$, $C_3$), then the processing of the peak hold circuits ($A_3$, $C_3$) follows these fluctuations so that there is no problem.

The control systems for each of the line image sensors 11a, 11b and 11c are independently make up on each of the printed circuit boards 20a, 20b and 20c. In the example described above, the switches 54a and 54c are off and the switch 54b is on so that the printed circuit board 20b on which the line image sensor 11b is fixed is the master board, and the other printed circuit boards 20a and 20c are the slave boards.

When the side edges of the various types of original document conveyed so as to always be in agreement with the end of the scan line (side edge reference), the switches 54a and 53c are on and the switch 54b is off so that the line image sensors 11a or 11c at a two side become the master, and the other line image sensor becomes the slave.

In the embodiment described above, the image signal from the center line image sensor 11b of the three line image sensors 11a, 11b and 11c disposed on the read line, is used as the basis for detecting (i.e. peak hold of) the background level. Then, this background level is used as the basis for converting the image signals from all of the line image sensors 11a, 11b and 11c into image data (AE function) and so the background portion of the original is converted definitely into a white level. In addition, the image signal obtained from that portion of the line image sensor corresponding to a position that is passed by all original documents from small-size to large-size within the range for which read is allowed, is used as the basis for the detection of the background level. Because of this, even if there is a change in the size of the original document, it is not necessary to change the line image sensor for detecting the background level.

The image signal from the original document portion are supplied to the peak hold circuit 48b that holds the white level. Because of this, even if there is a black image in the image portion, the background level supplied to the analog-to-digital converters 44a, 44b and 44c is not adversely affected by that black image. Accordingly, even if there are thick lines and characters on the original document 31, there is no change in the detected background level and so image data where the background level is a definite white can be obtained.

Figure 8B:
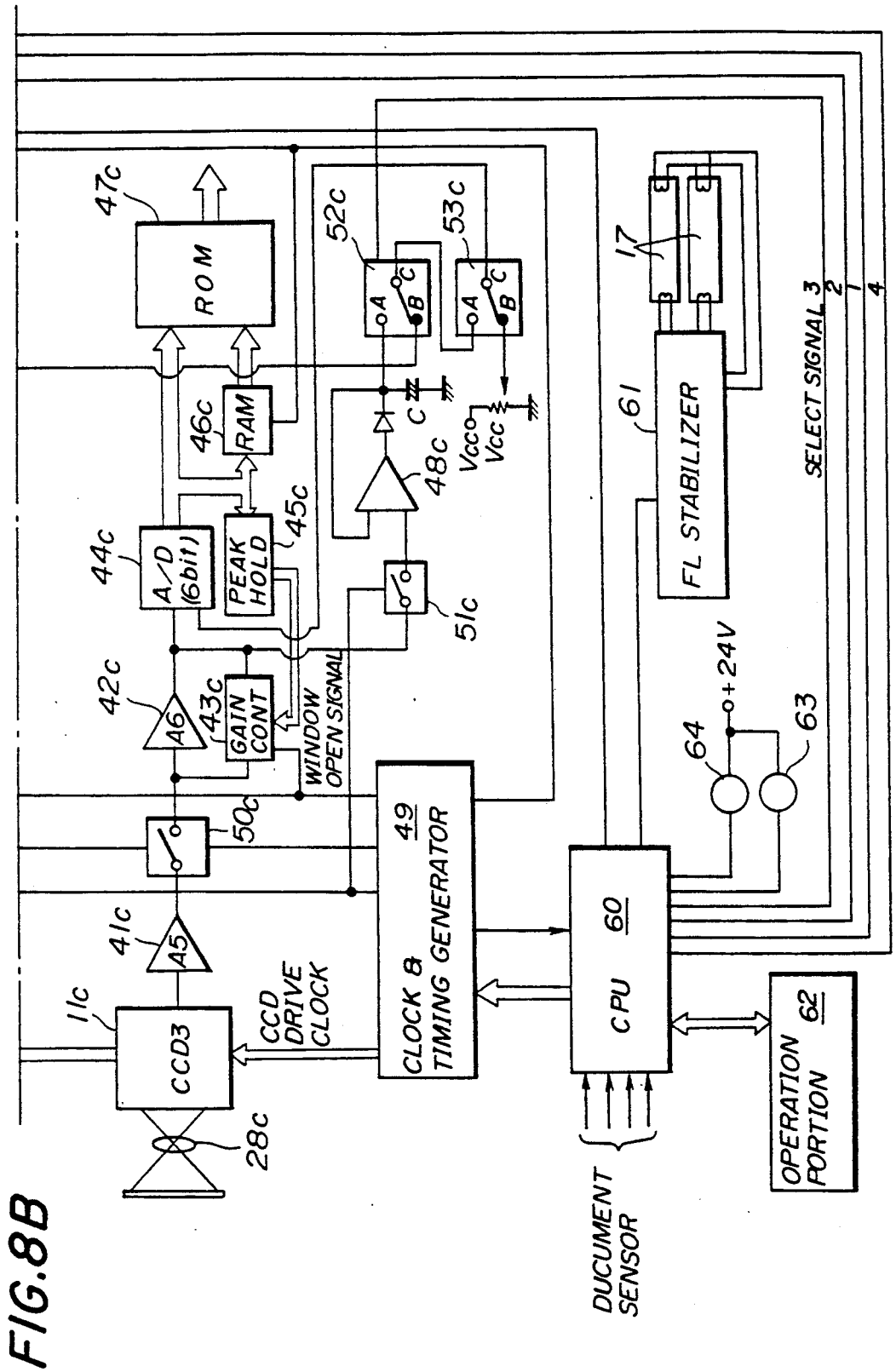

FIGS. 8A and 8B are views indicating a control system of an second embodiment according to the present invention. In FIG. 8A and FIG. 8B, those portions that are the same as corresponding portions in FIGS. 4A and 4B are indicated with the same numerals.

In this second embodiment, the switching of the analog switches 54a, 54b and 54c is performed by select signals SL1 through SL3 from the CPU 60. Then, the analog switch 55 is switched by the select signal SL4.

The analog switch 55 switches the AE control by the background level obtained by the control system of the line image sensor 11a for the edge, and AE control by the background level obtained by the control system for the line image sensor 11b.

The analog switches 52a and 52c select the terminal B and the analog switch 52b selects the terminal A, and when the analog switch 55 selects the terminal A, then in the same manner as in the first embodiment, AE control is performed on the basis of the background level obtained by the control system of the line image sensor 11b. In addition, when analog switch 52a selects the terminal A, when analog switches 52b and 52c select the terminal B, and when analog switch 55 selects the terminal B, then AE control is performed on the basis of the background level obtained by the control system of the edge portion line image sensor 11a.

Figure 9B:
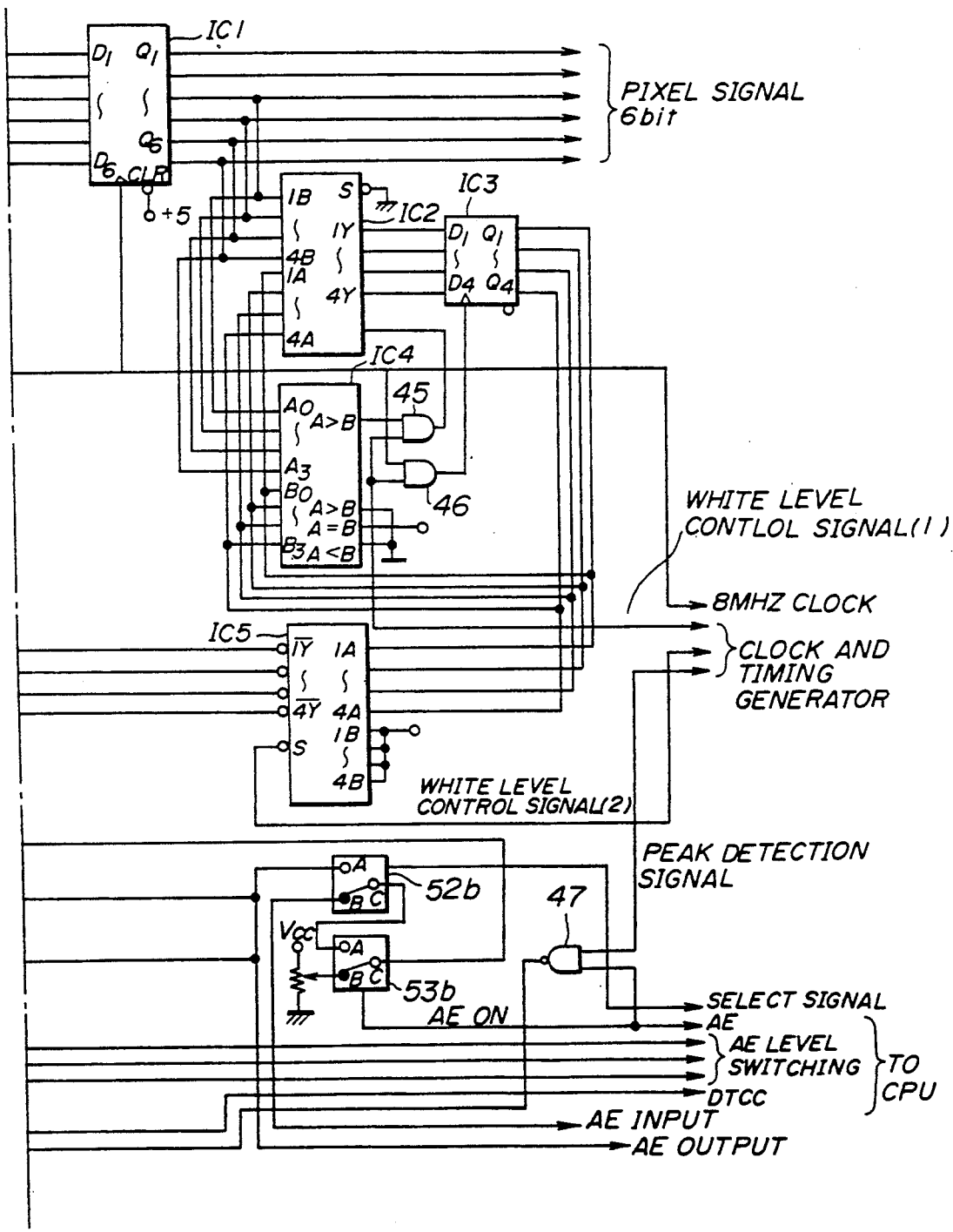

FIG. 9A is a partial detailed view of the FIGS. 8A and 8B. In FIG. 9A and 9B, those portions that are the same as corresponding portions in FIGS. 5A and 5B are indicated with the same numerals.

In FIGS. 9A and 9B, the select signal SL is input to the analog switch corresponding to FIGS. 8A and 8B.

In this second embodiment, when there are portions on the original for which the tone is particularly low (black), the switching of the select signals SL1 through SL4 on the basis of the input from the operation portion 62 avoids the detection of a background level at those portions where the tone is low. Accordingly, it is possible to convert the background definitely to the white for many types of original document Furthermore, by controlling the output timing and output width of the AE control signal (corresponding to the "window open signal") output from the clock and timing generator 49, it is possible to finely control the position for the detection of the background level within one image sensor.

As has been described above, according to the present invention, the background level of an original is definitely controlled to a white level even if a small original is scanned by a plural number of line sensors.

Further, the present invention is not limited to these embodiments, but various variations and modifications may be made without departing from the scope of the present invention.

What is claimed is:

1. An image reading apparatus comprising:
   a plural number of line image sensors disposed on a read line, images being produced on the basis of image signals output from said line image sensors when said line image sensors scan an original document;
   background detection means for detecting a background level of said original document on the basis of an image signal from a sample portion of a reference line image sensor predetermined as a line image sensor facing said original document, said sample portion being predetermined as a portion facing said original document; and
   conversion means for converting image signals output from said line image sensors, into image data expressed as a relative level when said background level detected by said background detection means is used as a white reference level.

2. The image reading apparatus of claim 1 wherein said background detection means has a peak hold circuit holding a peak level of said image signal from said sample portion of said reference line image sensor, a peak level held in said peak hold circuit becoming said background level of said original document.

3. The image reading apparatus of claim 1 wherein said background detection means has means for outputting signal that becomes valid at a scan timing of said sample portion of said reference line image sensor, said background level being detected on the basis of said image signal output from said reference line images sensor when said signal from said means become valid.

4. The image reading apparatus of claim 2 wherein said background detection means further includes means for outputting signal that become valid at a scan timing of said sample portion of said reference line image sensor, and gate means for supplying said image signal output from said reference line image sensor to said peak hold circuit when said signal from said means become valid.

5. The image reading apparatus of claim 4 wherein said gate means has a transistor provided between a line and ground from said reference line image sensor to said peak hold circuit, said transistor being switched on and off by said signal.

6. The image reading apparatus of claim 2 wherein said peak hold circuit has a capacitor that is charged by said image signal from said sample portion of said reference line image sensor, and a time constant circuit with respect to said capacitor and that makes a discharge time constant larger than a charge time constant.

7. The image reading apparatus of claim 6 wherein said time constant circuit has switching means for switching said discharge time constant.

8. The image reading apparatus of claim 2 wherein said background detection means further includes a gain control circuit to change said background level supplied from said peak hold circuit to said conversion means.

9. The image reading apparatus of claim 3 wherein said means has signal adjustment means for adjusting at least one of an output width and an output timing of said signal.

10. The image reading apparatus of claim 1, wherein:
said background detection means has sensor switching means for switching said reference line image sensor among said plural number of line image sensors.

11. The image reading apparatus of claim 1 wherein said conversion means has an analog-to-digital converter provided so as to correspond to each of said line image sensors, said image signal from said line image sensor being input to an analog input terminal of said analog-to-digital converter, and said background level being input to a reference input terminal of said analog-to-digital converter.

* * * * *

UNITED STATES PATENT AND TRADEMARK OFFICE
CERTIFICATE OF CORRECTION

PATENT NO. : 5,105,286

DATED : April 14, 1992

INVENTOR(S) : Tetsuo Sakurai

It is certified that error appears in the above-identified patent and that said Letters Patent is hereby corrected as shown below:

On the title page:
The assignee has been omitted, should be, --Ricoh Company, Ltd., Tokyo, Japan--.

Signed and Sealed this

Twenty-fifth Day of January, 1994

Attest:

BRUCE LEHMAN

*Attesting Officer*  *Commissioner of Patents and Trademarks*